United States Patent Office 2,765,979
Patented Oct. 9, 1956

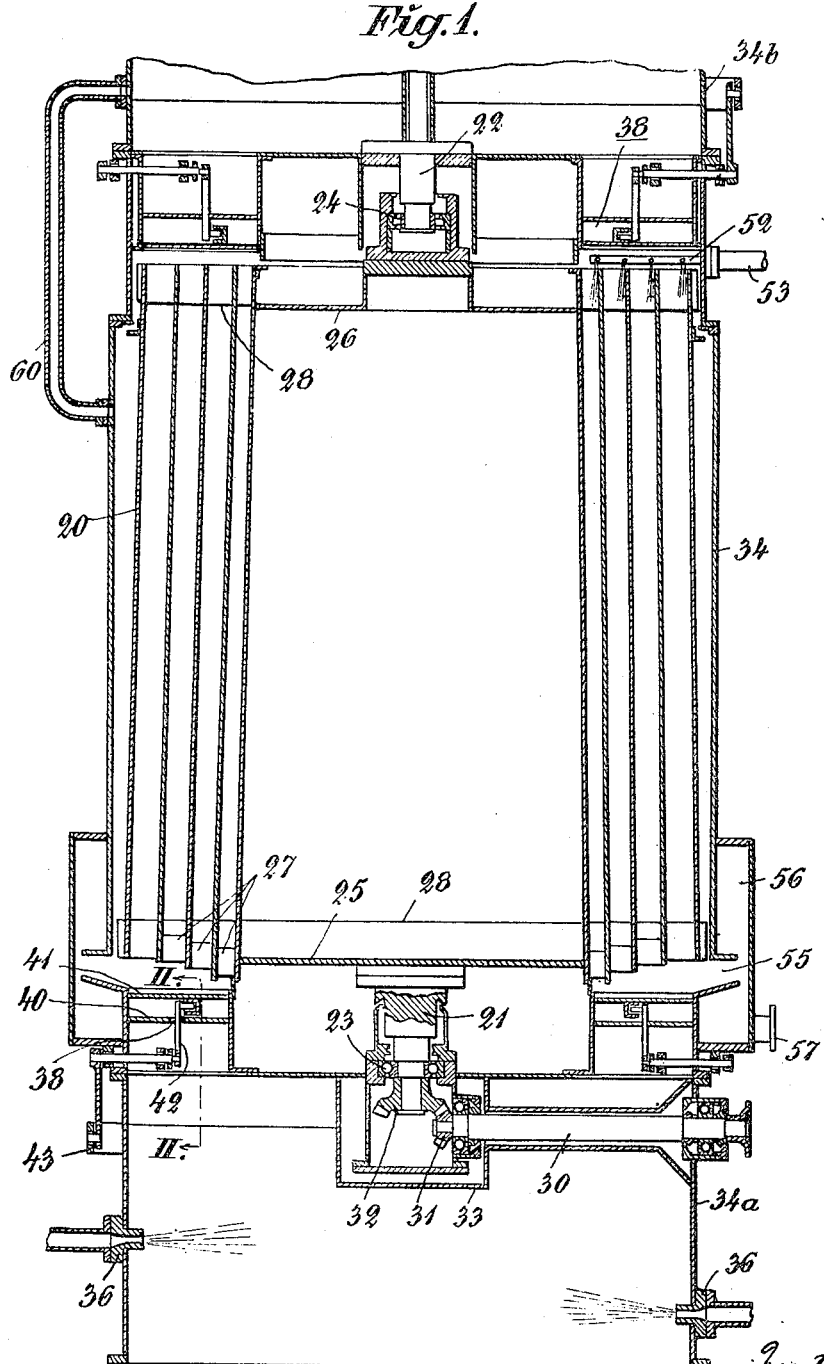

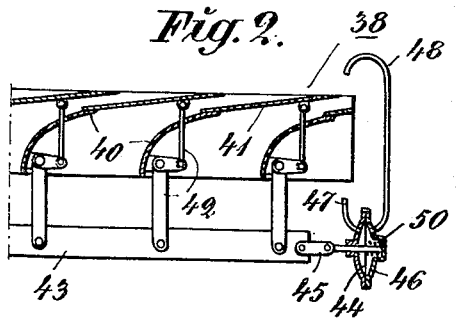
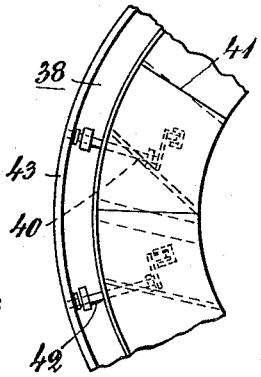
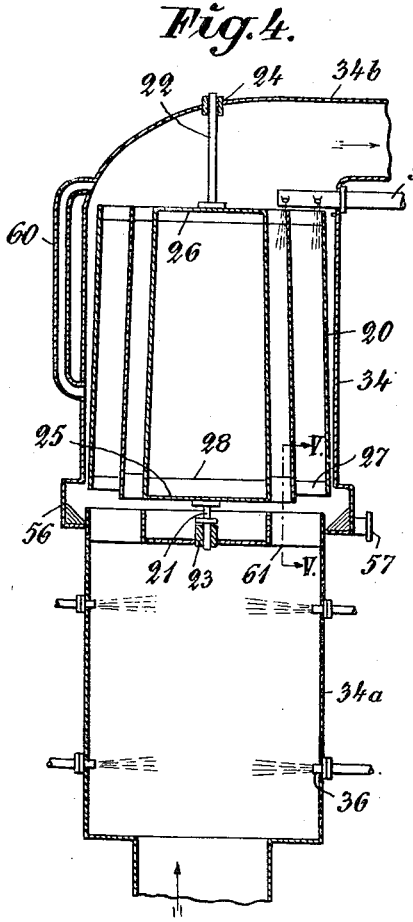
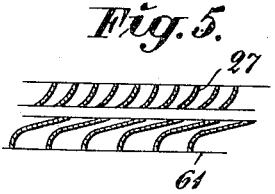

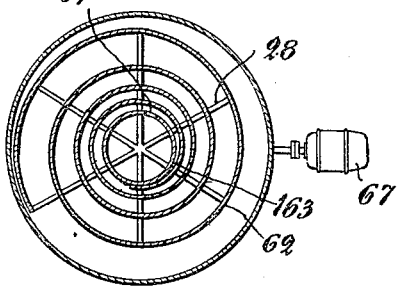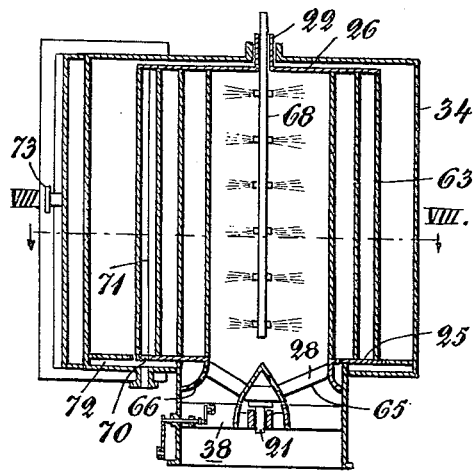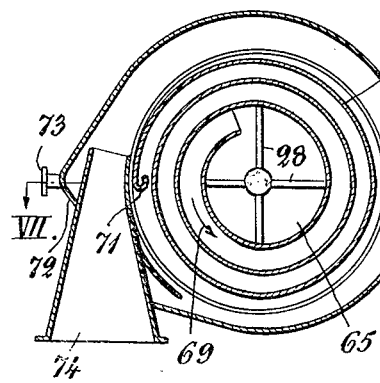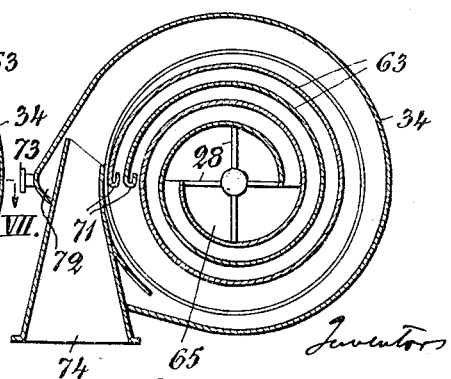

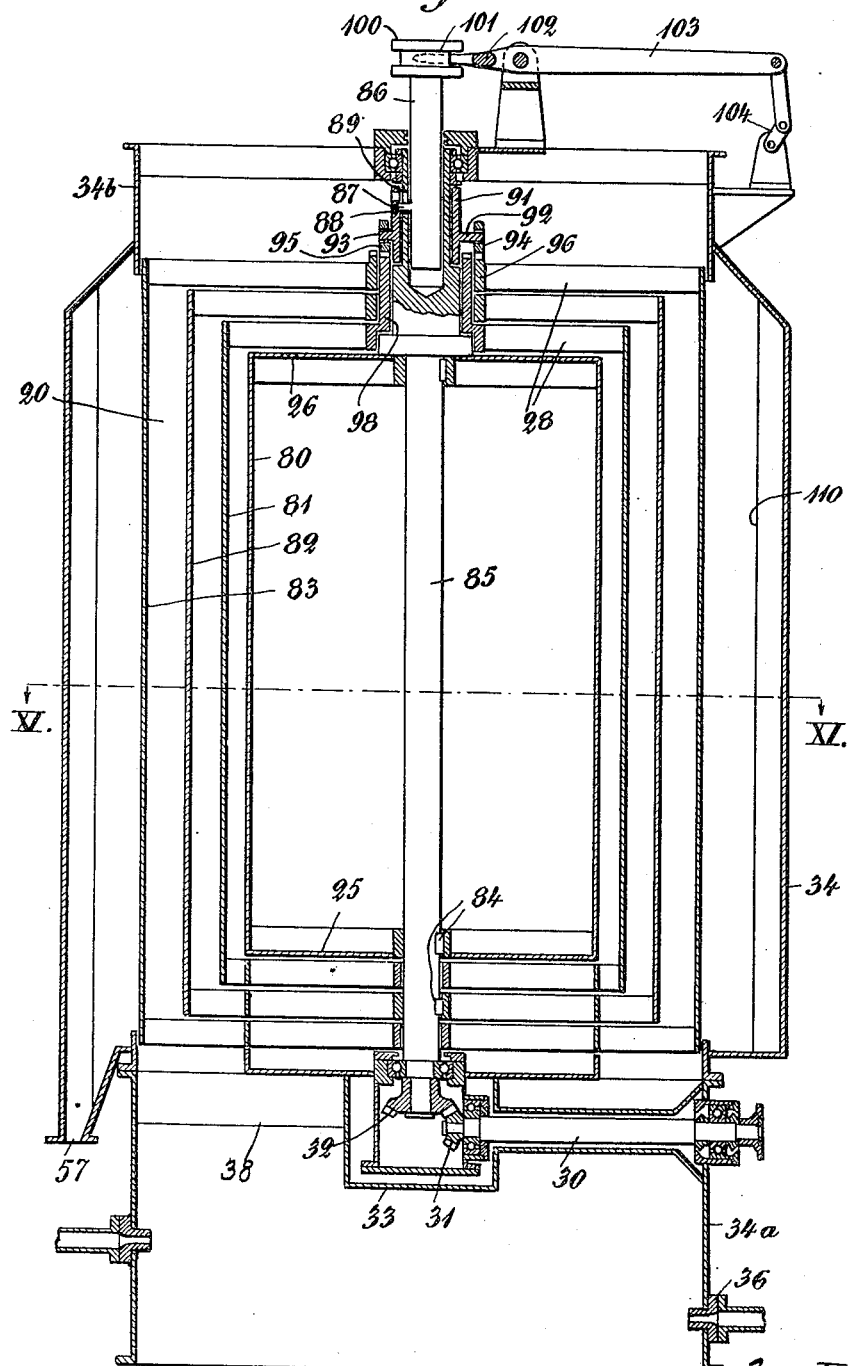

2,765,979

CENTRIFUGES FOR SEPARATING PARTICLES FROM GASES

Gustav Karl William Boestad, Lidingo, and Teodor Immanuel Lindhagen, Stockholm, Sweden, assignors, by mesne assignments, to Svenska Rotor Maskiner Aktiebolag, Nacka, Sweden, a corporation of Sweden Continuation of application Serial No. 448,768, June 27, 1942. This application April 22, 1949, Serial No. 89,027. In Sweden June 21, 1941

Section 1, Public Law 690, August 8, 1946
Patent expires June 21, 1961

2 Claims. (Cl. 233—19)

This application is a continuation application replacing our copending application Serial No. 448,768 filed June 27, 1942, now abandoned.

Our invention relates to centrifuges for the separation of particles from gases or air, for instance for the separation of stray cinders from combustion gases. When a gas rotates within a cylindrical vessel, the particles contained in the gas will be thrown outwardly at a velocity determined by the magnitude of the centrifugal force and by the resistance offered by the gas to the motion of the particles in question. If the gas containing the particles is allowed to rotate for a certain time in the vessel, then all particles should, theoretically, collect at the peripheral portion of the vessel and deposit on the wall thereof. However, the centrifuges of this type as hitherto known have a comparatively inferior purifying effect, inasmuch as the separation of the particles is rendered more or less incomplete due to the fact that secondary whirls or vortexes are formed along the wall of the vessel. It is therefore a principal object of the present invention to provide an improved centrifuge which will eliminate the defects of prior types of devices and will be capable of effectively separating particles of very small size from the gases in which they are carried. A further object of the invention is to provide such a device which is also economical and positive in its operation.

Further objects and advantages of the invention will be apparent from the following description considered in connection with the accompanying drawings, which form a part of this specification, and of which:

Fig. 1 is a longitudinal section through a centrifuge constructed in accordance with the invention;

Fig. 2 shows a guide blade ring with a shifting device in a section on the line II—II of Fig. 1;

Fig. 3 shows these members viewed from above;

Fig. 4 is a longitudinal section through another embodiment of the invention;

Fig. 5 is a section on the line V—V of Fig. 4;

Fig. 6 is a cross-section of a modification of the invention;

Fig. 7 is a longitudinal section on the line VII—VII of Fig. 8 through a further embodiment of the invention;

Fig. 8 is a section on the line VIII—VIII of Fig. 7;

Fig. 9 is a cross-section of a somewhat modified embodiment of the construction according to the two last-mentioned figures;

Fig. 10 shows a longitudinal section through a centrifuge in which the particles separated in the rotor are removed from the latter by means of a mechanical device, this figure being a section on the line X—X of Fig. 11;

Figure 11:
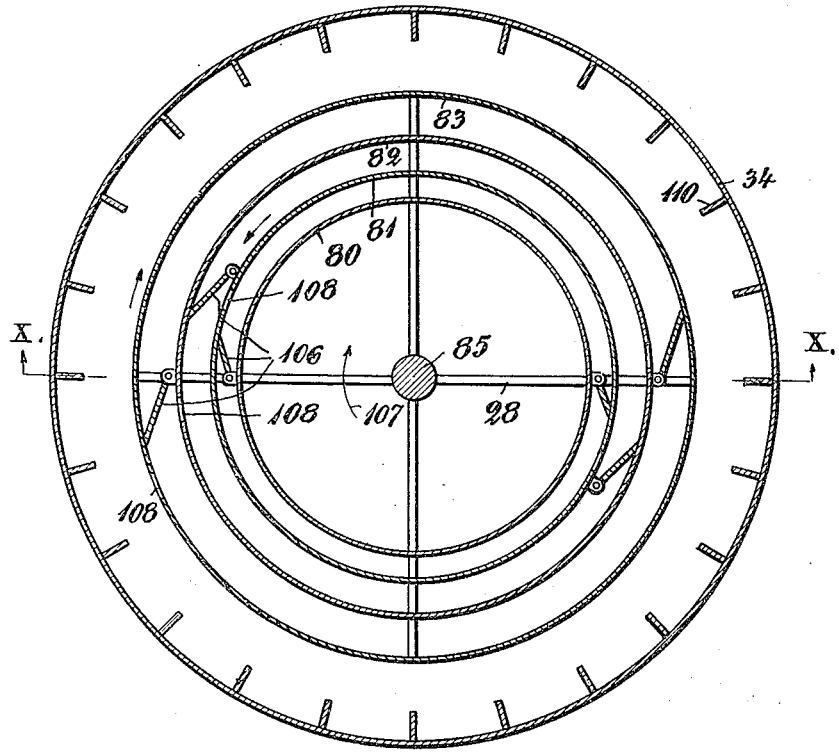
Fig. 11 is a section on the line XI—XI of Fig. 10.

In all of the drawings, equivalent parts are given the same reference numerals. In the embodiment according to Figs. 1–3, 20 designates a rotor comprising a suitable number, in the present case five, of concentrically arranged drums carried by shafts 21, 22, which are mounted in and guided by bearings 23 and 24, respectively. The rotors are connected with each other and to the shafts 21, 22 by means of cross braces 28 and discs 25, 26, which at the same time form head walls of the innermost drum. In the embodiment according to Figs. 1–3, the drums are slightly conical, the larger end of the drums being turned downwardly in Fig. 1.

The rotor 20 is driven by a motor (not shown) which is connected to a shaft 30 in engagement with the shaft 21 by means of bevel gears 31, 32. Said bevel gears are enclosed within a casing 33 which is carried by the external housing 34 of the centirfuge and is arranged in the central portion of the centrifuge.

The gas to be purified is supplied with the aid of a pumping device to the open bottom end of the lower portion 34a of the centrifuge housing according to Fig. 1, which portion may be provided with nozzles 36, through which water is injected into the gas in a finely divided state. Arranged in front of the rotor 20 in the path of the gas stream is a guide blade system, generally denoted by 38. This guide blade system consists of guide blades 40 adapted to deflect the gas stream so that a rotary motion is imparted to the same. Preferably, the guide blades 40 are rigidly connected with flexible tongues 41, which are controllable so that the passage area of the guide blade system may be regulated. To this end the tongues 41 are connected to a lever system 42 which is pivotally secured to an annular rail 43. One end portion of the rail 43 may be connected to a diahpragm 44 (Fig. 2) by a link 45. The diaphragm 44 is disposed within a casing 46 and divides the latter into two chambers, one of which opens into the space in front of the guide blade apparatus 38 through a conduit indicated at 47, while the other chamber communicates with the outlet side of the guide blade apparatus through a conduit 48. In the latter chamber there may be provided a compression spring 50 bearing on the diaphragm 44. Depending on the difference in pressure in front of and behind the guide blade apparatus the diaphragm 44 assumes different positions and at the same time displaces the rail 43 and thus the tongues 41 to the desired passage area.

The centrifugal force acting on the gas increases with the distance from the axis of rotation. Inasmuch as the centrifuging effect is thus greater on a larger radius than on a smaller one, the distance between the concentric drums in the rotor 20 may be made successively greater, according as the radius increases, as will appear from Fig. 1.

When a gas has rotational flow in space, the velocities of rotation adjust themselves according to known hydraulic rules so as to become greater nearer to the center than at the periphery. For the rotors the state of things is reversed. The walls of the drums located nearer to the center will thus rotate at a lower peripheral velocity than the outer ones. Therefore, if the rotational velocity of the gas be adapted to the guide blade system 38 so that it will coincide with the speed of rotation of the rotor, there will still be a relative velocity between the rotor and the gas in other places. According to the invention, drawbacks of this kind are avoided by means of blades 27 in the gas inlet of the rotor (see also Fig. 5) which at a decrease in the velocity deflect the incoming gas stream to a velocity in a peripheral direction corresponding to the speed of the rotor on the radius in question. In this case the velocity of the gas behind the guide blade is adapted to the outermost clearance between the drums, which consequently need not have any such blades. The inlet angles of the blades 27 should preferably decrease in the outward direction. If desired, a guide blade system 38 may also be provided at the outlet side 34b of the centrifuge for the purpose of deflecting the flow of the gas to an approximately axial direction relative to the fixed housing.

In the embodiment according to Figs. 1–3, the separated particles are removed from the drums 29 with the aid of a liquid, such as water, which is introduced at the upper relatively narrower end portion of the drums through a conduit 53 provided with nozzles or apertures 52. Preferably, these apertures are obliquely positioned so that the water is injected approximately in a direction tangential to the direction of rotation of the drums. On account of the slightly conical shape of the drums the water is caused to form a layer covering the inside of each drum, said layer moving slowly downwards, in the present case in a direction opposed to that of the gas stream. At the lower portion of the rotors, the water is thrown outwardly through an opening 55 in the housing into a chamber 56 provided with a lower outlet 57.

To prevent leakage of gas admixed with particles into the purified gas, the outlet side 34b of the centrifuge may be connected by means of a conduit 60 with the space between the outermost drum and the centrifuge housing. The pressure is greater at the outlet side through the lower gas velocity in that place compared with the gas velocity behind the first guide blade apparatus 38, by reason of which any leakage will take place in a direction from the outlet side 34b into the said space. In certain cases, the space may instead communicate with the outer atmosphere for the same purpose.

The device operates in the following manner. The inpure gas is introduced by means of the above-mentioned pump into the lower portion 34a of the apparatus, where it is preferably moistened by means of water injected through the nozzles 36. This water absorbs injurious gases, such as sulphur dioxide, should such gases be present in the gas. The water also has a certain binding action on the particles and increases their weight so that centrifuging is facilitated. The guide blade system 38 then imparts a rotary motion to the gas, the blade system 27 ensuring that the gas is given a peripheral velocity between the various drums of the rotor, which is the same or approximately the same as the speed of rotation of the drums. While the gas is at the same time moving upwardly between the drums, the particles are being separated, and are taken up by the water films, whereupon the purified gas escapes at the top. The particles are conveyed with the water continuously from the rotor, and escape through the chamber 56 and the outlet 57, respectively.

If the centrifuge operates at different loads, the adjustable guide blade system 38 ensures that the peripheral velocity of the gas in the rotor will even at low loads become sufficiently effective to purify the gas. In the case of a decrease of the load the pressure will increase at the outlet side of the guide blade system. This results in the diaphragm 44 moving the rail 43 to the left in Fig. 2, so that the resilient tongues 41 reduce the passage area, and the velocity of the gas becomes sufficiently low when the gas flows into the rotor.

The embodiment according to Figs. 4 and 5 differs from the preceding one principally by the fact that the rotor 20 has no special driving means but is rotated by the gas to be purified, which for this purpose flows through guide blades 61 and blades 27 in a manner known per se. The guide blades 61 are rigid in this embodiment, which is primarily intended for such cases where a varying load does not occur, but which is also conceivable for uses where the demands for the centrifuging are less at a small load.

Instead of being provided with concentric drums the rotor may consist of one or more spirals 62, which may be driven by a motor 67, as appears from Fig. 6. The spiral 62 is connected with the rotor shafts by means of suitable arms 28 or the like. In this case, the liquid conveying the particles from the rotor may be introduced into a drum 163 at the inner periphery of the spiral, and may flow outwardly through openings 64 in the drum under the action of the centrifugal force.

In the embodiments above described, the gas is conveyed axially through the rotor while a peripheral velocity is being imparted thereto, which is substantially equal to the rotational speed of the rotor. Figs. 7 and 8 show an embodiment where the gas passes through the rotor in a radial direction. The rotor has the form of a sheet metal spiral 63 provided with a central inlet opening 65 for the gas at the one end thereof. The end walls 25, 26 of the rotor are extended to the outer periphery of the spiral. Before the gas enters the rotor its motion is deflected for instance by means of a guide blade apparatus 38 of the kind above described. To obtain a soft flow, the innermost sheet metal convolution of the spiral 63 may be extended downwardly, and may at the same time be rounded off outwardly, as indicated at 66. To connect the rotor with the lower shaft 21, braces or arms 28 may be provided. The distance between the convolutions of the spiral decreases in this case in an outward direction in order to maintain a relative velocity as constant as possible between the gas and the spiral wall. The gas rotates somewhat more rapidly than the spiral, the direction of rotation of which is in that case according to the arrow 69. In this case, too, the separated particles are removed from the rotor by a liquid, such as water, which is introduced through a central pipe 68 provided with nozzles. The outer end portion of the spiral is preferably folded, as shown at 71, the water being caused to escape from the spiral through an opening 70 in the end wall 25 of the drum. This opening opens into a pocket 72 provided with an outlet 73 which also collects water hitting the housing 34. The purified gas escapes through a diffuser 74. The rotor may either be operated by gas or be driven by a motor.

The embodiment according to Fig. 9 is of the same type as the preceding one, with the difference only that the rotor consists of two or more spirals 63. This embodiment facilitates a larger capacity of the centrifuge, without it being necessary to increase the relative velocity between the walls of the spiral and the gas.

Figure 12:
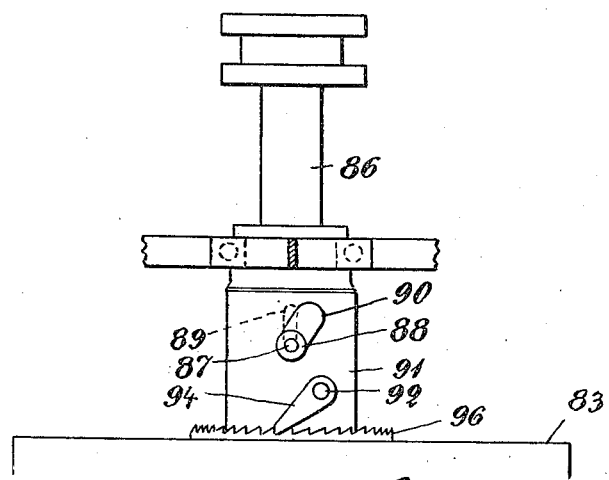
Fig. 12 shows a detail of the same centrifuge in elevation.

Figs. 10–12 show an embodiment of the invention, in which the separated particles are removed from the drums of the rotor by mechanical means. The rotor 20 has, for instance, four drums 80–83. The innermost drum 80 and the third drum 82, counted from within, are rigidly connected by means of keys 84 or the like to the rotor shaft 85, while the two remaining drums 81 and 83 are rotatable relative to the shaft.

The upper, preferably enlarged portion of the rotor shaft 85 according to Fig. 10 is adapted to receive a shaft 86 provided with a radially projecting pin 87, which may carry a roller 88. The pin 87 is extended through an elongated axial recess 89 in the rotor shaft 85 of nearly the same width as the diameter of the pin. The pin 87 enters with the roller 88 into a recess 90 in a sleeve 91 surrounding the rotor shaft. The recess 90 likewise is of an elongated shape, but extends obliquely relative to the axis of the centrifuge. The sleeve 91 is provided with two pins 92, 93 each of which carries a pawl 94, 95. The one pawl 94 is adapted to cooperate with teeth on a ring or sleeve 96 (see Fig. 12), which is connected by means of the cross braces 28 to the outermost drum 83. The pawl 95 cooperates with teeth on a ring 98 which is connected to the drum 81 by means of cross braces 28. The pawls are positioned in opposite directions relative to each other in a manner such that the pawl 94 carries the drum 83 along at the rotation of the sleeve 91 in the one direction (according to the arrow 107 in Fig. 11) but slides over the teeth of the sleeve 96 at the rotation of the sleeve in the opposite direction in a manner to be described more fully in the following. The pawl 95 carries the drum 81 along at the rotation of the sleeve 91 in a direction opposite to that of the arrow 107, while sliding over the teeth of the sleeve 98 at the rotation of the sleeve in the direction of the arrow 107.

The shaft 86, which is mounted in the rotor shaft 85, is provided at the top with a collar 100 which is formed with an annular slot 101 adapted to receive the bifurcated end 102 of a lever 103 mounted in the fixed frame of the centrifuge. The lever 103 is connected in known manner at its opposite end to an eccentric, crank shaft or the like 104 and is vertically reciprocated through the latter from any suitable driving means, such as the driving motor of the rotor, in which movement the shaft 86 is carried along.

Pivoted on the outer sides of the drums 80-82 are scrapers 105 which may extend along the whole of the drums in axial direction between the cross braces 28 carrying the same. On account of the action of the centrifugal force the scrapers 106 bear on the inside of the respective outer drums with so great a frictional force that the drums 81 and 83 will also be entrained at the rotation of the shaft 85 and at the same number of revolutions as the latter. The scraper carried by the innermost drum 80 extends obliquely outwards toward the drum 81 in the direction of rotation of the drum 81 (arrow 107), while the scrapers of the drums 81 and 82 extend in the opposite direction. Immediately adjacent their scrapers 106 the drums 81 and 82 are provided with axially extending openings 108. The outermost drum 83 also has one or more openings 108 of the same kind. The housing 34 of the centrifuge is preferably provided with radial flanges 110 terminating at a suitable distance from the outermost drum 83.

In the operation of the centrifuge the rotor shaft 85 is driven by the shaft 30 in the direction of the arrow 107, the rotor shaft then driving the drums 80 and 82 directly by the keys 84 and the drums through the friction set up by the scrapers 106 under the action of the centrifugal force. At the same time the shaft 86 moves up and down, and by the fact that the roller 88 enters the oblique slot 90 said shaft causes a relative movement in peripheral direction between the sleeve 91 and the shafts 85, 86. Thus a relative movement between the drum 83 and the drum 82 is effected by the pawl 94 when the shaft 86 moves in an upwardly direction. This relative movement consequently takes place in the direction of the arrow 107. On the other hand, when the shaft 86 moves downwardly, the pawl 94 slides over the teeth of the sleeve 96, while the pawl 95, which was inactive during the upwardly movement of the shaft 86, will now drive the drum 81 in a direction opposite to that of the arrow 107. In addition to their rapid rotational movement, the drums 81 and 83 will thus have a rotary stepwise movement relative to the two other drums. The magnitude of the relative movement between the drums may be varied arbitrarily and may amount for instance to one or a few revolutions for 100 revolutions of the rotor. During the relative movement the scrapers 106 scrape off and entrain the particles separated from the gas which, as in the embodiments according to Figs. 1-6, flows in an axial direction between the drums from the lower chamber and upwardly according to Fig. 10. When during the relative movement the scraper 106 secured to drum 80 has reached the opening 108 in the drum 81, the dust collected will be thrown out through this opening so as to be deposited in front of the scraper carried by said drum, and so forth. From the opening 108 of the outermost drum the dust is thrown out into the external housing 34 and escapes through the lower opening 57.

Evidently, the particular means shown in the various figures of the drawings may be used in each form of construction. When the rotor is provided with blades 27, the gas may in certain cases be given a suitable rotational velocity in the rotor without the aid of guide blades or spiral housings in the fixed part. The rotor may be driven with washing liquid according to the embodiments shown in Figs. 1-9.

While several embodiments of the invention have been shown, it is to be understood that these are for purpose of illustration only, and that the invention is not to be limited thereby, but its scope is to be determined by the appended claims.

What we claim:

1. A centrifuge for separating solid particles from a gas comprising a casing structure having a gas inlet chamber at one end for admission of impure gas and an outlet chamber at the opposite end for discharge of purified gas, a rotor mounted for rotation in said casing between said chambers, said rotor comprising a series of radially nested axially extending drums of different diameter providing between them a plurality of concentric annular gas conducting channels communicating at their ends with said inlet and outlet chambers, respectively, means for turning said rotor within said casing, and guide means for guiding gas flowing from said inlet chamber to said channels comprising a ring of generally radially extending guide blades carried by said casing structure and located axially between said inlet chamber and the inlet ends of said channels, said guide blades being angularly disposed to direct the gases entering the channels in a helical path of flow generally coaxial with the rotor axis and with a rotational component of flow approximating the rotational velocity of said drums, and an annular ring of substantially radially extending guide blades carried by said casing for converting the helical flow of the gas leaving said annular channels to substantially axial flow to said outlet chamber.

2. A centrifuge for separating particles from a gas comprising a rotor adapted to rotate about an axis, means providing an inlet channel for supplying impure gas to said rotor, means providing an outlet channel for the purified gas leaving the rotor, guide means for imparting to the gas entering the rotor an initial velocity and direction such that its movement relative to the rotor wall upon which the particles are thrown by centrifugal force is small, whereby substantially to prevent particles adjacent the rotor wall from being thrown back into the body of gas by secondary whirls created by substantial relative velocity between the gas and the rotor wall, said guide means comprising movable blades controlling the inlet area for admitting gas to the rotor and means responsive to the pressure differential of the gas on the two sides of the blades to control their position.

References Cited in the file of this patent
UNITED STATES PATENTS

| | | |
|---|---|---|
| 403,701 | Seck | May 21, 1889 |
| 1,057,613 | Baldwin et al. | Apr. 1, 1913 |
| 1,350,009 | Del Valle | Aug. 17, 1920 |
| 1,749,057 | Armentrout | Mar. 4, 1930 |
| 1,768,617 | Lee | July 1, 1930 |
| 1,810,922 | Mills | June 23, 1931 |
| 1,879,107 | Couch | Sept. 27, 1932 |
| 1,906,457 | Flowers | May 2, 1933 |
| 1,997,971 | Lindberg | Apr. 16, 1935 |
| 2,031,734 | Riebel | Feb. 25, 1936 |
| 2,104,683 | Van Rosen et al. | Jan. 4, 1938 |
| 2,195,730 | Lindgren | Apr. 2, 1940 |